March 25, 1969  A. C. SWINNEY  3,434,742

TAPERED BEARING SWIVEL

Filed Sept. 29, 1967

INVENTOR.
ALVIS C. SWINNEY
BY
MARCUS L. BATES

United States Patent Office 3,434,742
Patented Mar. 25, 1969

3,434,742
TAPERED BEARING SWIVEL
Alvis C. Swinney, Rte. 1, Box 204D,
Odessa, Tex. 79760
Filed Sept. 29, 1967, Ser. No. 671,627
Int. Cl. F16l 55/00, 55/18; F16j 15/00
U.S. Cl. 285—16                                      7 Claims

ABSTRACT OF THE DISCLOSURE

A tapered roller bearing swivel for conducting fluid flow from a fixed source to a rotating drill stem. Spaced apart roller bearings are housed within a supporting cross and a spider is secured to the top of the cross. A tapered hollow spindle is rotatably received within the bearings for providing fluid flow into the drill stem. A gooseneck is attached to the upper extremity of the spider for providing fluid flow into the swivel. A reversible wear bushing, packing ring, and a packing nut are interposed between the gooseneck and the upper extremity of the spindle to provide an adjustable seal between the fixed and rotating parts of the swivel.

Background of the invention

This invention relates to apparatus for providing fluid flow from a stationary source to a rotating member. In drilling bore holes into the surface of the earth using a rotary type drilling apparatus, a rotary machine imparts rotational motion to a Kelly which in turn imparts rotational motion to the drill stem. It is necessary to provide fluid flow to the drill bit located on the terminal end of the rotating drill stem. This is generally accomplished by suspending the bail of a swivel from a traveling block wherein the swivel rotatably supports the drill stem while a stationary portion of the swivel is attached to the block. The block is generally provided with a wire rope rove between the block attached to the swivel and to a second fixed block located at the top of the derrick. Fluid, such as drilling mud, is pumped into the stationary part of the swivel, whereupon it flows into the rotating spindle of the swivel, and into the rotating drill stem where it ultimately emerges at the drill bit. Swivels are expensive and complex for the reason that they must be able to rotatably support the enormous weight of long strings of drill pipe. The problem of providing a swivel connection which sealingly permits fluid flow from a stationary conduit to a rotating conduit while at the same time supporting the heavy string of pipe obviously calls for a device which is rugged in construction and dependable in operation over an extended period of time so as to preclude expensive down-time of drilling rigs.

Summary

It is, therefore, desirable to provide rotary drilling apparatus with a swivel which is simple in construction, reliable in operation, and which maintains the drilling fluid or mud sealingly confined therewithin so as to preclude leakage upon the derrick floor.

An object of the present invention is the provision of a tapered bearing swivel which is simple in design, rugged in construction, and which is provided with a seal which precludes leakage of drilling fluid onto the derrick floor.

Another object of the present invention is the provision of a tapered bearing swivel having an improved seal means between the rotating and stationary members thereof.

A still further object of the present invention is the provision of a tapered bearing swivel within which there is incorporated an improved adjustable seal located between the stationary and rotating parts thereof.

A still further object of the present invention is the provision of a tapered bearing swivel having spaced apart roller bearings associated therewith which improves the operation of the swivel.

A still further object of the present invention is the provision of an improved swivel cross having a roller bearing and grease retaining chamber which improves the life of the swivel.

Another object of the present invention is the provision of a tapered bearing swivel which permits flow from a stationary conduit into a rotating conduit in an improved and different manner.

The above objects are attained in accordance with the present invention by the provision of a tapered bearing swivel fabricated essentially in accordance with the above abstract.

Description of the preferred embodiments

Figure 1:
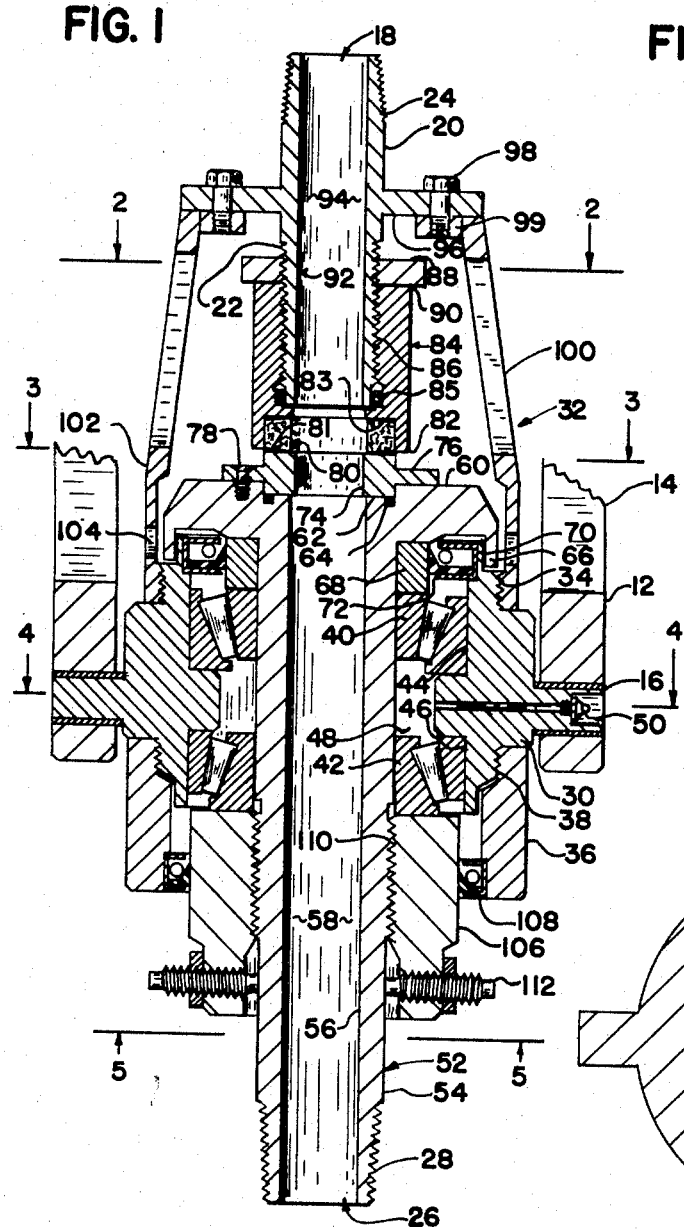
FIGURE 1 shows a longitudinal cross-sectional view of a tapered bearing swivel made in accordance with the teachings of the present invention.
Figure 2:
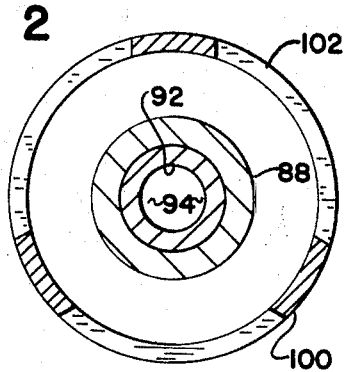
FIGURE 2 is a slightly reduced cross-sectional view taken along line 2—2 of FIGURE 1.
Figure 3:
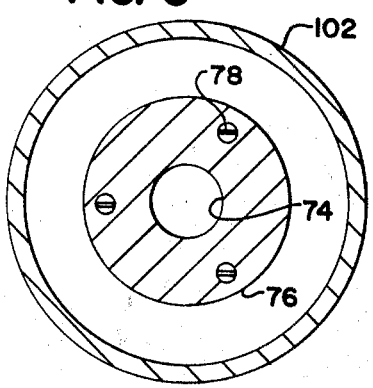
FIGURE 3 is a slightly reduced cross-sectional view taken along line 3—3 of FIGURE 1.
Figure 4:
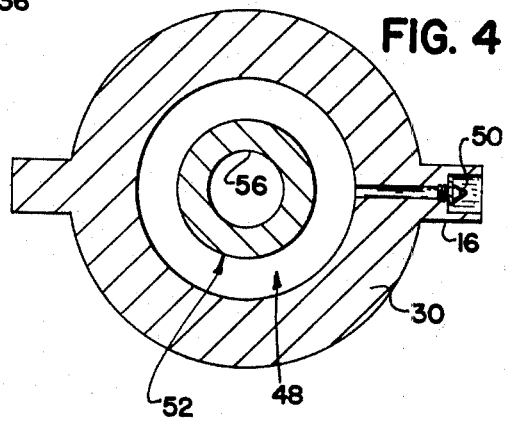
FIGURE 4 is a slightly reduced cross-sectional view taken along line 4—4 of FIGURE 1.
Figure 5:
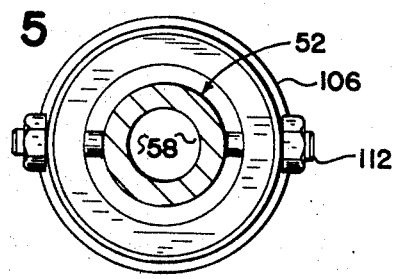
FIGURE 5 is a cross-sectional view taken along line 5—5 of FIGURE 1.

Looking now to the details of the drawings, wherein there is seen in FIGURE 1 a longitudinal cross-sectional view of a tapered bearing swivel adapted to be supported by a traveling block, or the like, by means of the journaled member 12 which forms part of a bail 14. Depending lugs 16 receive the before mentioned journaled portion of the bail. The fixed inlet end of the swivel is generally indicated by the arrow at numeral 18 and includes an upstanding stationary conduit 20, hereinafter called a "gooseneck," and having lower and upper threads 22 and 24, respectively.

The main body portion 30, comprised of a cylindrical bearing housing, hereinafter called a "cross," is rigidly attached to a spider 32 by means of the threaded connection seen at 34. A second cylindrical body portion 36 is attached to the lower extremity of the cross by means of the threads seen at 38.

The cross receives an upper and lower roller bearing 40 and 42, each having the usual cone and cup as seen in FIGURE 1. The bearing cups are slidably received in tight fitting relationship within counterbores 44 and 46 respectively. The annular area left between the spaced apart roller bearings provides a grease cavity 48. A grease fitting, which is in communication with the cavity, is seen fitted onto a lug extending from the cross at numeral 50.

The rotatable spindle is generally illustrated by the arrow at numeral 52, and includes an outer tapered peripheral wall surface 54, an inner peripheral wall surface 56 which defines a passageway 58, and an outwardly directed flange 60 having a parallel step, or shoulder 62, as seen at the upper extremity of the spindle. Between the shoulder and the flange there is provided an O-ring received within a groove 64. A downwardly depending skirt 66 depends from the outer periphery of the flange. A seal and bearing spacer 68 is press fitted onto the outer wall of the spindle in abutting relationship with the lower face of the spindle flange for maintaining the spindle in properly aligned relationship with respect to the seal and cross. The cross includes an upwardly depending skirt 70 which is loosely received within but free of the before mentioned skirt 66. A grease seal 70 is press fitted into the annulus provided on the inside peripheral wall surface of the skirt 70 and sealingly cooperates at 72 with the spacer 68.

Wear bushing 74 is received within the before mentioned step and includes a circumferentially extending outwardly directed flange 76 which radiates from the midportion of the bushing. A multiplicity of screws 78 maintain the wear bushing rigidly affixed within the step of the spindle in the illustrated manner of FIGURE 1. The bushing is symmetrical about a plane passing through and parallel to the flange thereof.

A packing ring, generally illustrated by the arrow at numeral 80, may be made of any suitable resilient material, such as graphite or Teflon, which has a long life and does not require lubrication. The packing ring is tapered as seen at 81 and is symmetrical about a line drawn perpendicular to its central axis. The packing ring is received within the annular cavity formed by the depending skirt 82 and the shoulder 83 of the packing gland 84. An annular groove for receiving an O-ring is provided as seen at 85. The packing gland 84 is provided with threads 86 which mate with similar threads located on the gooseneck 20. A packing nut 88 maintains the gooseneck locked to the packing gland and the seal at 85 precludes loss of fluid from the swivel joint.

The inside wall 92 of the gooseneck forms a passageway 94 through which fluid may flow. The circumferentially extending flange 96 receives fasteners 98 therethrough to thereby rigidly affix the gooseneck to the ring flange 99 of the spider. Numeral 100 indicates three spaced apart legs which form the spider cage. Bell portion 102 of the spider is a solid ring and accordingly, drain holes 104 are provided at the lower extremity thereof.

An adjusting nut 106 abuts the race of the lower bearing and cooperates with seal 108 to complete the isolation of grease cavity 48. Threads 110 enable the adjusting nut to be properly positioned with respect to the cross while circumferentially disposed locking screws 112 secure the parts together.

The swivel is best assembled by fitting the upper and lower bearings into the cross by using a hydraulic press to force the cup of the bearing into the respective upper and lower counterbores. The seal and bearing spacer is next pressed onto the tapered spindle. Upper and lower seals 72 and 108 are then pressed into their respective positions within the cross and the adjusting nut. The spindle is then telescoped into the bearings, taking care that the bottom face of the outwardly directed flange 60 bottoms against the seal and bearing spacer 68. Adjusting nut 106 is next tightly screwed onto the spindle until threads 110 are properly made up. Set-screws 112 are then tightened to lock the nut to the spindle.

Wear bushing 74 is next placed upon the step 62 where it bears against O-ring 64. Fasteners 78 are placed into position and the outwardly flange 76 fastened against the upper face of the outwardly directed flange 60. Threads 34 of spider 32 are then made up.

Gooseneck 20 is next assembled by screwing the lock nut 88 and packing gland 84 by means of threads 22 and 86, with the O-ring 85 properly positioned in the illustrated manner of FIGURE 1. Packing ring 80 is placed into position above the packing ring and the gooseneck is affixed to the ring flange of the spider by means of fasteners 98. The packing gland is then properly positioned where it bears against the packing ring with sufficient force to provide a seal, with lock nut 88 securing the assembly against rotational movement. The device is then properly lubricated at grease fitting 50.

In operation, the threads 28 are mated to the upper depending end of a Kelly which in turn is connected to the upper terminal end of a string of drill pipe. The gooseneck 20 is provided with an elbow which in turn is connected to a flexible line leading to the drilling mud pump.

Drilling mud is forced through the gooseneck, packing ring, wear bushing, and spindle where it then flows through the string of drill pipe in the usual manner. Since the bail 14 supports the cross by means of the outwardly directed lugs 16, the cross, spider, gooseneck, and packing gland are held stationary while the spindle, wear bushing, adjusting nut 106, and bearing cones rotate in low friction relationship with respect to the roller bearings.

During usage, adjusting nut 106 may be tightened to eliminate any play which may develop between the upper and lower bearings. Should leakage occur at the swivel joint, the packing gland can be tightened against the packing ring by merely loosening the lock nut and tightening the packing gland. Shuold the packing ring or the wear bushing show signs of undue deterioration, either part may be reversed by merely turning it upsidedown to thereby present a different wear face.

The downwardly depending flange 66 forms a protective cage about the upper seal 72. The rotational movement of the spindle allows the outer periphery of the flange 66 to act as a slinger ring, thereby preventing foreign substance from entering between the skirt and the upwardly depending skirt 70 of the cross.

I claim:
1. A tapered bearing swivel for conducting the flow of fluid from a fixed source to a rotating drill stem, the improvement comprising:
  a cross including a bearing housing having upper and lower counterbores, tapered roller bearings mounted in said counterbores;
  a hollow tapered spindle received through said roller bearings, said spindle having a radially outwardly directed flange of larger diameter than the minimum diameter of said bearings at the upper extremity thereof;
  a spider having a lower end affixed to the upper end of said cross, said spider including a ring flange at the upper extremity thereof;
  a wear bushing, packing ring, and packing gland;
  a gooseneck having an inlet, an outlet, and a longitudinal passageway therethrough, a flange circumferentially disposed about the outside of said gooseneck, means securing the last said flange to said ring flange;
  means securing said wear bushing to the upper face of said flange of said spindle, said packing gland being adjustably affixed to a lower extremity of said gooseneck, said packing ring being slidably received between and in sealing engagement with said wear bushing and said packing gland, whereby;
  said hollow spindle rotates in said bearings while said gooseneck remains stationary to thereby perform the stated function of conducting fluid from a fixed pipe to a rotating drill stem.

2. The combination of claim 1 wherein said outwardly directed flange of said spindle includes a downwardly depending skirt about the outer marginal edge portion thereof;
  said bearing housing of said cross includes an upwardly directed skirt received within said spindle skirt;
  a grease seal located between said spindle and said upwardly directed skirt, whereby;
  said spindle skirt acts as a slinger ring to preclude debris entering said seal.

3. The combination of claim 1, wherein radially outwardly directed means having a diameter larger than the minimum diameter of said bearings are mounted on said spindle below said lower bearing and wherein said upper and lower roller bearings are arranged with their normal lower extremities facing each other whereby the upper bearing acts as a thrust bearing when the swivel supports the drill pipe, and said lower bearing acts as a thrust bearing when said swivel rests on the drill pipe.

4. The combination of claim 1 wherein said wear bushing includes a radially extending flange circumferentially disposed about the outer peripheral wall surface thereof, said wear bushing being symmetrical about a horizontal plane passing through said flange, whereby;
said wear bushing can be reversed to thereby present either wearing surface thereof to said packing ring.

5. The combination of claim 1, and further including a lower adjusting nut secured to said spindle and bearing against the cone of said lower bearing;
a downwardly depending sleeve attached to the lower depending end of said cross; and
a grease seal located between said sleeve and said lower adjusting nut.

6. The combination of claim 1 wherein said outwardly directed flange of said spindle includes a downwardly depending skirt about the outer marginal edge portion thereof;
said cross includes an upwardly directed skirt received within said spindle skirt;
a grease seal located between said spindle and said upwardly directed skirt, whereby said spindle skirt acts as a slinger ring to preclude debris entering said seal; and radially outwardly directed means having a diameter larger than the minimum diameter of said bearings are mounted on said spindle below said lower bearing and wherein
said upper and lower roller bearings are arranged with their normal lower extremities facing each other whereby the upper bearing acts as a thrust bearing when the swivel supports the drill pipe, and said lower bearing acts as a thrust bearing when said swivel rests on the drill pipe.

7. The combination of claim 1 wherein said outwardly directed flange of said spindle includes a downwardly depending skirt about the outer marginal edge portion thereof;
said bearing housing includes an upwardly directed skirt received within said spindle skirt;
a grease seal located between said spindle and said upwardly directed skirt, whereby said spindle skirt acts as a slinger ring to preclude debris entering said seal;
said wear bushing includes a radially directed flange circumferentially disposed about the outer peripheral wall surface thereof, said wear bushing being symmetrical about a plane passing through and parallel to said flange, whereby;
said wear bushing can be reversed to thereby present either wearing surface thereof to said packing ring.

References Cited

UNITED STATES PATENTS

| 1,514,871 | 11/1924 | Sperry | 285—281 X |
| 2,031,337 | 2/1936 | Spalding | 285—281 X |
| 2,676,788 | 4/1954 | Davidson et al. | 285—275 X |

FOREIGN PATENTS 533,943  12/1956  Canada.

CARL W. TOMLIN, *Primary Examiner.*

DAVE W. AROLA, *Assistant Examiner.*

U.S. Cl. X.R.

285—90, 94, 272